(12) United States Patent
Kaiser et al.

(10) Patent No.: US 11,976,992 B2
(45) Date of Patent: May 7, 2024

(54) VACUUM-TIGHT ELECTRICAL FEEDTHROUGH

(71) Applicant: INFICON AG, Balzers (LI)

(72) Inventors: Stefan Kaiser, Gamprin (LI); Bernhard Andreaus, Rapperswil (CH)

(73) Assignee: INFICON AG, Balzers (LI)

( * ) Notice: Subject to any disclaimer, the term of this patent is extended or adjusted under 35 U.S.C. 154(b) by 165 days.

(21) Appl. No.: 17/761,996

(22) PCT Filed: Sep. 20, 2019

(86) PCT No.: PCT/EP2019/075368
§ 371 (c)(1),
(2) Date: Mar. 18, 2022

(87) PCT Pub. No.: WO2021/052600
PCT Pub. Date: Mar. 25, 2021

(65) Prior Publication Data
US 2022/0341802 A1  Oct. 27, 2022

(51) Int. Cl.
*G01L 21/34* (2006.01)
*F16L 5/02* (2006.01)

(52) U.S. Cl.
CPC ............ *G01L 21/34* (2013.01); *F16L 5/02* (2013.01)

(58) Field of Classification Search
CPC ............................. G01L 21/00; G01L 21/34
USPC ................................................ 324/463, 627
See application file for complete search history.

(56) References Cited

U.S. PATENT DOCUMENTS

| 5,049,816 A * | 9/1991 | Moslehi ............ G01R 31/2656 324/762.02 |
| 6,701,789 B1 | 3/2004 | Denny |
| 8,456,167 B2 | 6/2013 | Key |

(Continued)

FOREIGN PATENT DOCUMENTS

| DE | 1473636 A1 | 10/1968 |
| DE | 3712874 A1 | 5/1988 |

(Continued)

OTHER PUBLICATIONS

PCT; International Search Report issued in International Patent Application No. PCT/EP2019/075368; dated Jun. 9, 2020, 7 Pages including translation.

(Continued)

*Primary Examiner* — Vincent Q Nguyen
(74) *Attorney, Agent, or Firm* — Procopio, Cory, Hargreaves & Savitch LLP

(57) ABSTRACT

A vacuum pressure sensor includes a vacuum-tight electrical feedthrough. The feedthrough has an electrically insulating insulator element with a through-opening, having a first boundary surface adjacent to the through-opening and a second boundary surface also adjacent to the through-opening and opposite to the first boundary surface, and an electrically conductive conductor element which extends through the through-opening and which is connected to the insulator element in a vacuum-tight manner along a circumferential line of the conductor element. The insulator element is transmissive to electromagnetic radiation in an optical wavelength range and the first boundary surface and/or the second boundary surface is formed as a curved surface.

14 Claims, 3 Drawing Sheets

(56) References Cited

U.S. PATENT DOCUMENTS

2003/0025443 A1* 2/2003 Kamiguchi ............. H01J 29/92
                                                    313/495
2004/0179187 A1   9/2004 Mettes
2010/0277724 A1  11/2010 Bounouar et al.
2016/0131548 A1   5/2016 Brucker et al.
2017/0357100 A1* 12/2017 Ouderkirk .......... G02B 19/0028

FOREIGN PATENT DOCUMENTS

GB      2441582 A      3/2008
WO   2019082893 A1    5/2019

OTHER PUBLICATIONS

PCT; Written Opinion issued in International Patent Application No. PCT/EP2019/075368; dated Jun. 9, 2020, 8 Pages.
International Report on Preliminary Patentability for PCT/EP2019/075368. dated Mar. 15, 2022. Pgs. 8.

* cited by examiner

VACUUM-TIGHT ELECTRICAL FEEDTHROUGH

CROSS-REFERENCE TO RELATED APPLICATIONS

This application is US National Stage of International Patent Application PCT/EP2019/075368, filed Sep. 20, 2019, the contents of which are incorporated herein by reference.

FIELD OF INVENTION

The present invention relates to a vacuum-tight electrical feedthrough. The invention further relates to a vacuum pressure sensor having the electrical feedthrough.

DESCRIPTION OF RELATED ART

It is known to guide electromagnetic radiation emitted by a plasma out of a vacuum region through an optical window and to measure or analyze it. The source of such radiation often takes the form of a cloud-like distributed array of point sources and emits divergent and relatively weak radiation. Therefore, the radiation intensity available outside the vacuum region is often weak.

BRIEF SUMMARY OF THE INVENTION

It was the object of the present invention to increase the radiation intensity available for measurements and analysis of electromagnetic radiation emitted in a vacuum region. In particular, it was an object of the invention to increase radiation intensity available for measurements and analysis of radiation emitted from a vacuum pressure sensor in the optical range.

This object is solved according to the invention by a vacuum-tight electrical feedthrough.

The vacuum-tight electrical feedthrough according to the invention comprises an electrically insulating insulator element having a through-opening, having a first boundary surface adjacent to the through-opening and having a second boundary surface likewise adjacent to the through-opening and opposite the first boundary surface. The vacuum-tight electrical feedthrough according to the invention further comprises an electrically conductive conductor element which extends through the through-opening and which is connected to the insulator element in a vacuum-tight manner along a circumferential line of the conductor element. The insulator element is transmissive to electromagnetic radiation in an optical wavelength range. The first and/or the second boundary surface is formed as a curved surface. The curved surface can in particular be formed as a convex or concave surface.

The electrically conductive conductor element thus extends through the through-opening in the insulator element. It defines a feedthrough axis of the electrical feedthrough. The first and second boundary surfaces each surround the conductor element on one side of the insulator element and are spaced apart in the direction of the feedthrough axis. In use in a vacuum system, one of the boundary surfaces, for example the first boundary surface, is arranged on the vacuum side and the other of the boundary surfaces, for example the second boundary surface, is arranged on the side of the electrical feedthrough facing away from the vacuum. The insulator element may have further boundary surfaces in addition to the first and second boundary surfaces, for example a boundary surface of the through-opening facing towards the feedthrough axis in a radial direction with respect to the feedthrough axis. Further, the electrical feedthrough may have a boundary surface at a radial outwardly facing edge separating the first and second boundary surfaces at an outer periphery of the electrical feedthrough.

The shape and arrangement of the first and second boundary surfaces are designed in such a way that electromagnetic radiation incident on the insulator element in the direction of the feedthrough axis is focused as it passes through the insulator element, i.e., spaced-apart beams that extend in parallel before passing through the insulator element approach or cross each other after passing through. At most one of the first and second boundary surfaces may be planar. In particular, combinations of the first and second boundary surfaces forming a biconvex, biconcave, plano-convex or plano-concave arrangement are possible.

The inventors have recognized that it is particularly efficient to feed electromagnetic radiation of an optical wavelength range out of the vacuum region at the same point that electrical energy is fed through electrical feedthroughs into a vacuum region. The supplied electrical energy can be, for example, the electrical energy for generating a plasma. A feedthrough known from the basic structure with an electrical conductor which is passed through an insulator and wherein the conductor and the insulator are connected in a vacuum-tight manner can simultaneously act as an optical feedthrough due to the combination of features according to the invention.

The inventors have recognized that the electrical feedthrough according to the invention enables a compact design of devices in which both a supply of electrical energy into a vacuum region and the measurement or analysis of radiation emitted from the vacuum region are enabled simultaneously. The curved boundary surface(s) can be used to focus the radiation and thus increase the intensity of the radiation. The inventors have further recognized that this is particularly efficient if electrical and optical feedthrough are realized in one and the same component and if this component has at the same time the function of a lens. Thus, the invention can be seen as an electrical-optical vacuum feedthrough.

The electromagnetic radiation from an optical wavelength range can be, for example, visible light, infrared radiation or ultraviolet radiation. With the electrical feedthrough according to the invention, an increase in the intensity of the radiation by a factor of 100 or more can be achieved, compared to the radiation intensity which would be available, for example, via a simple, double-sided planar window outside the vacuum region.

The conductor element can be made of metal, in particular the conductor element can be made of molybdenum. The insulator element can be made of sapphire, for example.

Embodiments of the electrical feedthrough result from the features described below.

One embodiment of the electrical feedthrough further comprises a metallic frame connected to the insulator element in a vacuum-tight manner along a perimeter of the insulator element separating the first and second boundary surfaces.

The metallic frame enables the electrical feedthrough to be connected in a vacuum-tight manner to other elements of a vacuum system, for example by welding. The vacuum-tight connection between the insulator element and the metallic frame can be formed by a fused glass ring, for example. The fused glass ring can in particular consist of a solder glass. The metallic frame may be in the form of a ring. The metallic frame may, for example, have a flange which is configured to facilitate welding of the frame to further elements. The metallic frame can, for example, be made of a stainless austenitic steel, for example steel 1.4435, which is characterized by high corrosion resistance.

In one embodiment of the electrical feedthrough, the conductor element extends along an axis and the first boundary surface has a first region and the second boundary surface has a second region, with the first and second regions being in the form of first and second surfaces of revolution with the axis as a common axis of revolution.

The first and/or the second surface of revolution can be a spherical or an aspherical surface of revolution. A special case of a surface of revolution is a plane that is perpendicular to the axis. For example, the first boundary surface may extend along a plane perpendicular to the axis. In this case, the second boundary surface must necessarily be curved.

In one embodiment of the electrical feedthrough, the conductor element is of rod-shaped design and the conductor element has a first rod end that extends further beyond the first boundary surface than a second rod end extends beyond the second boundary surface.

This embodiment can be used, for example, if electromagnetic radiation is to be focused in an area outside the first rod end. A connection of the conductor element in the area of the first end of the rod to a current supply can be made, for example, via a tab which is brought transversely to the rod to the area near the first end of the rod. A tab arranged in this way covers only a small amount of the usable cross-sectional area through which radiation can reach the focal point.

In one embodiment of the electrical feedthrough, the insulator element forms an imaging lens that images at least a first object point in the region between the first boundary surface and the first rod end onto a first image point that is further away from the first boundary surface than the second rod end.

An imaging lens is characterized by its focal length F. An object point with distance G from the lens is imaged into an image point with distance B from the lens, wherein the relation $1/G+1/B=1/F$ applies.

A lens system corrected for spherical and/or chromatic aberration can be achieved by a multi-part construction of different materials. In such a system, it is sufficient that one lens of the lens system has the role of the insulator element, which is connected in a vacuum-tight manner to the conductor element.

In one embodiment of the electrical feedthrough, the insulator element is a plano-convex lens with a central through-opening.

In one embodiment of the electrical feedthrough, the insulator element is made of sapphire.

Sapphire has a high transmittance in the wavelength range 200 nm to 5000 nm, making it particularly suitable for guiding electromagnetic radiation out of the optical range with little loss from a vacuum region. In particular, transmission in the ultraviolet range above 200 nm is high. Furthermore, sapphire is mechanically very robust.

In one embodiment of the electrical feedthrough, a fused glass ring forms a vacuum-tight connection between the conductor element and the insulator element.

To produce the vacuum-tight connection, the fused glass ring is melted and the conductor element is glassed in. The fused glass ring can consist in particular of a solder glass.

The features of the embodiments of the electrical feedthrough can be combined as desired within the scope of the invention, provided that they are not mutually exclusive.

The invention further relates to a vacuum pressure sensor according to claim 9. The vacuum pressure sensor according to the invention has an electrical feedthrough according to the invention. All of the above-mentioned embodiments of the electrical feedthrough are suitable for use in the vacuum pressure sensor according to the invention.

Embodiments of the vacuum pressure sensor result from the features described below.

In one embodiment of the vacuum pressure sensor, the vacuum pressure sensor is designed as a cold cathode vacuum meter and the conductor element forms the anode of the cold cathode vacuum meter.

In one embodiment of the vacuum pressure sensor, the first boundary surface faces a plasma region of the vacuum pressure sensor and an optical sensor on the side of the second boundary surface is arranged such that electromagnetic radiation of the optical wavelength range can propagate from the plasma region through the insulator element to the optical sensor.

In one embodiment of the vacuum pressure sensor having an electrical feedthrough according to an embodiment in which the insulator element forms an imaging lens that images at least a first object point in the region between the first boundary surface and the first rod end onto a first image point that is further away from the first boundary surface than the second rod end, the first object point is located in the plasma region of the vacuum pressure sensor and the optical sensor is arranged at the first image point.

In one embodiment of the vacuum pressure sensor, the plasma region is restricted by a magnet assembly to an end of the anode remote from the insulator element.

This can be achieved, for example, by arranging pole shoes of ferromagnetic material in a ring around the anodes, wherein the pole shoes are closer to the anode in a region which is close to the insulator element of the electrical feedthrough than in a second region which is further away from the insulator element. Such an arrangement causes the main radiation source to form in the second region.

In one embodiment of the vacuum pressure sensor, the conductor element has an electrically insulating coating in a region near the insulator element.

Such an electrically insulating coating suppresses the formation of a plasma close to the insulator element and the plasma is ignited in the target area, namely where the anode has no insulating coating. An electrically insulating coating may, for example, consist of a thin layer of aluminum oxide ($Al_2O_3$ layer). The coating can be applied to the anode using, for example, an atomic layer deposition (ALD) process. The application of an ALD process leads to a very uniform coating thickness without defects, so that the desired suppression of plasma ignition can already be achieved with a very thin insulation layer.

The invention further relates to a method as described below.

This is a method for measuring a radiation intensity of electromagnetic radiation in an optical wavelength range, wherein the method comprises the steps of:
a) providing a vacuum apparatus having an electrical feedthrough according to the invention;
b) supplying electrical energy through the conductor element into a vacuum region of the vacuum apparatus to ignite and maintain a plasma in the vacuum region;

c) measuring the radiation intensity of electromagnetic radiation emitted from the plasma by means of an optical sensor;

wherein the electromagnetic radiation radiates from the plasma through the insulator element onto the optical sensor.

In particular, the measurement can be applied to a single wavelength, e.g., to a specific emission line of a residual gas in vacuum. For example, the characteristic oxygen emission line can be observed at approximately 777 nm. A change in line intensity can serve as an indicator of a leak. Leak detection is possible within 60 seconds—unlike methods in which the chamber is heated to 600° C., for example, and subsequent cooling must be waited for.

Alternatively, intensities of other lines, such as nitrogen, which serves as a purge gas, can be observed. Hydrogen leaks or nitrogen leaks can be quickly detected by measuring the intensity at a corresponding hydrogen or nitrogen emission line.

The application of the method in connection with vacuum pressure sensors allows the correction of the gas dependence of a current-pressure characteristic. A linearization of the pressure signal depending on the detected gas becomes possible. Components of the gas composition can be determined from the measured radiation intensities at defined wavelengths.

An application of the electrical feedthrough according to the invention is particularly suitable for plasma sources. Examples of plasma sources are electron cyclotron resonance (ECR) ion sources, Penning discharges, inductively coupled plasma (ICP) or glow discharge sources, etc. In vacuum pressure sensors with Penning, magnetron and inverted magnetron arrays, plasmas are generated which emit radiation. These arrays can be built very compact and can ensure sufficient ion yield even at low pressures down to $10^{-8}$ mbar. The latter three plasma sources are grouped under the collective term ExB sources. These arrangements benefit particularly from the electrical implementation according to the invention.

One or more electrical feedthroughs according to the invention can be attached to one and the same vacuum system or to a vacuum device, for example to a vacuum pressure sensor. It is possible to guide electromagnetic radiation out of a plasma region along different paths and via two or more different insulator elements of different electrical feedthroughs out of the vacuum region or, alternatively or in combination, it is also possible to observe two or more plasma regions via electrical feedthrough with lens effect in the optical region. For example, the boundary surfaces of the insulator element can be shaped to focus electromagnetic radiation in more than one focal region. In all such cases, two (or more) optical detectors may be mounted on the side of the respective insulator element(s) facing away from the vacuum such that electromagnetic radiation in the relevant optical wavelength range is incident on one of the optical detectors each, where the intensity of the radiation is increased. For example, one detector may be designed to measure the intensity of a first wavelength or range of wavelengths and a second detector may be designed to measure a second wavelength or range of wavelengths. In this case, each of the detectors benefits from the effect of the invention, namely the increased intensity of the electromagnetic radiation.

BRIEF DESCRIPTION OF THE SEVERAL VIEWS OF THE DRAWINGS

Exemplary embodiments of the present invention are explained in further detail below with reference to figures, wherein:

in FIG. 4.b) in a top view of the image plane the distribution of radiation impinging on the image plane.

DETAILED DESCRIPTION OF THE INVENTION

Figure 1:
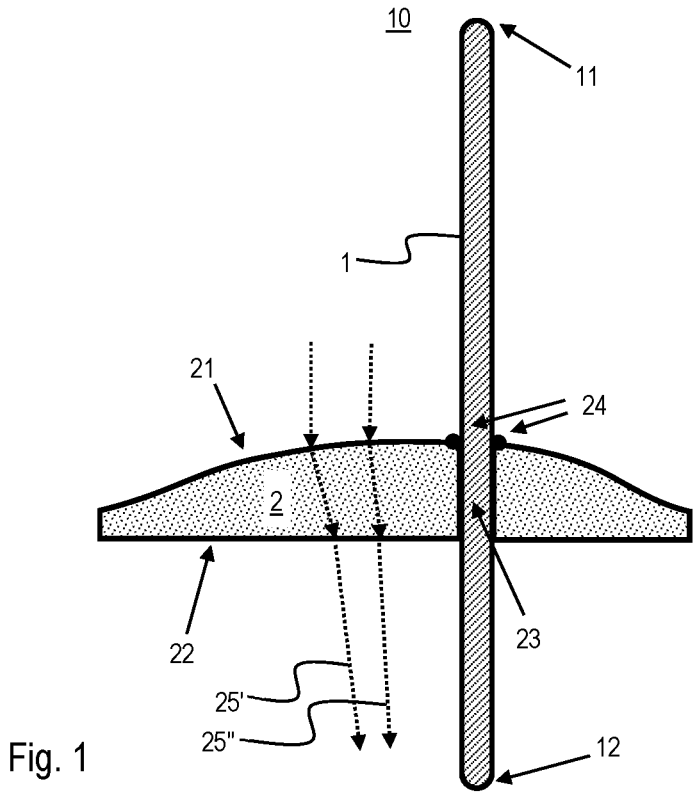
FIG. 1 schematically shows in a simplified manner a cross-section through a vacuum-tight electrical feedthrough according to the invention.

FIG. 1 shows a cross-section through a vacuum-tight electrical feedthrough 10 according to the invention. An electrically conductive conductor element 1 passes through a through-opening 23 of an insulator element 2. The conductor element shown has the shape of a rod having a first rod end 11 and a second rod end 12. There is a vacuum-tight connection between conductor element 1 and insulator element 2, which is symbolized in cross-section by filled circles. The vacuum-tight connection extends along a circumferential line around the conductor element and is intersected at two points in the plane of this cross-sectional view. On two opposite sides of the insulator element, a first boundary surface 21 of the insulator element and a second boundary surface 22 of the insulator element are adjacent to the through-opening. Exemplary electromagnetic radiation paths 25', 25" are shown with dashed line arrows. The exemplary radiation paths 25', 25" pass through the insulator element, which is transmissive in an optical wavelength range, and change direction at the first 21 and second 22 boundary surfaces. The two radiation paths shown strike the insulator element parallel to each other and parallel to the direction of the feedthrough axis, i.e., parallel to the longitudinal extension of the conductor element. After passing through the insulator element, the two radiation paths converge, illustrating the focusing effect of the electrical feedthrough according to the invention. In the embodiment shown, the first boundary surface is a curved surface, with an outer region being concave in shape and a central region being convex in shape. The second boundary surface is flat in the case shown.

Figure 2:
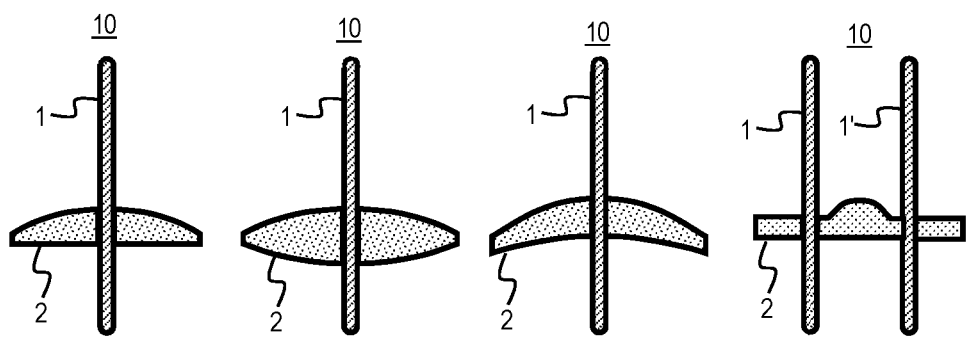
FIG. 2 shows in the subfigures FIG. 2.a) to 2.d) cross-sections through embodiments of the electrical feedthrough.

FIGS. 2.a) to 2.d) show variants of possible combinations of curvature types of the first and second boundary surfaces in cross-section. FIG. 2.a) shows a plano-convex arrangement, FIG. 2.b) shows a bi-convex arrangement, FIG. 2.c) shows a concave-convex arrangement and FIG. 2.d) shows an arrangement with a completely planar first boundary surface and a second boundary surface which is planar in the region around conductor elements 1, 1' which have been passed through, wherein a central region between the conductor elements is of convex design. Variant 2.d) illustrates an embodiment with more than one conductor element. The cross-section extends through the conductor element 1 and also through another conductor element 1' having the same characteristics as the conductor element 1 already discussed. FIGS. 2.a) to 2.c) show feedthroughs in which the conductor element passes centrally through the insulator element. These cross-sections may be, for example, the cross-sections of an electrical feedthrough of rotationally symmetrical construction. Although not illustrated with a graphic element, the feedthroughs shown in FIG. 2 and the following figures are designed to be vacuum-tight.

Figure 3:
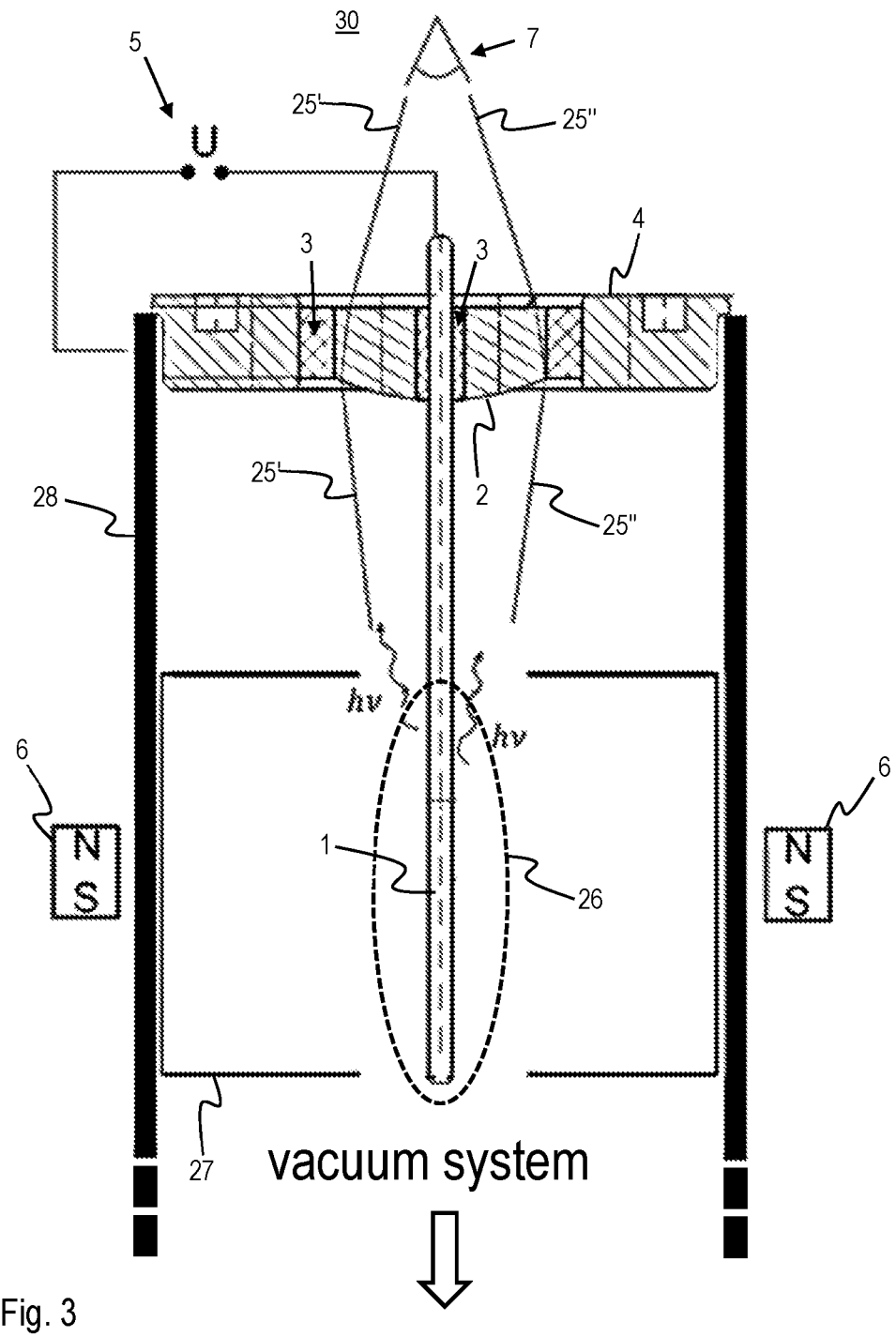
FIG. 3 shows a cross-section through an embodiment of the vacuum pressure sensor.

FIG. 3 shows a cross-section of a vacuum pressure sensor according to the invention. This is a vacuum pressure sensor which is designed as a cold cathode vacuum meter. The conductor element 1 forms the anode of the cold cathode vacuum meter. Conductor element 1 and insulator element 2 form an electrical feedthrough according to the invention, by means of which electrical energy can be supplied from a voltage source 5 to a plasma region 26, the position of which is indicated by the dashed line, within the pressure sensor. A magnet assembly 6 ensures that moving charged particles (electrons, ions) in the plasma region move along a curved path. Electromagnetic radiation (hν), which is characteristic of the state of the plasma, passes through the insulator element 2, which is transmissive at least in one optical wavelength range, to an optical sensor 7. Due to the curved boundary surfaces of the insulator element, the radiation is bundled and arrives at the optical sensor 7 with increased intensity. The optical sensor 7 can be a simple radiation sensor, e.g. a light sensor, but it can also be a more complex optical sensor, e.g. a spectrometer. In the arrangement shown, the outer wall of the vacuum pressure sensor forms the cathode of the cold cathode vacuum meter. It is also electrically connected to the voltage source 5. The side of the vacuum pressure sensor leading to the vacuum system is labeled "Vacuum System" without any details of the vacuum system being illustrated. It is understood that this side of the vacuum pressure sensor is connected to the vacuum system in a vacuum-tight manner. In the embodiment shown, the electrical feedthrough comprises a metallic frame 4. By means of one fused glass ring 3 each, the conductor element 1 is connected to the insulator element 2 in a vacuum-tight manner and the insulator element 2 is connected to the metallic ring 4 in a vacuum-tight manner. The metallic ring 4 is welded to the cathode, which is cylindrical in the embodiment shown and is also made of a metal.

For example, the insulator element of the electrical feedthrough can be designed as a plano-convex lens as shown here, wherein the first boundary surface has a spherical curvature with a radius of curvature R in sections. An arrangement with a spectrometer, which is arranged for example at a distance d=10 mm from the planar second boundary surface on the side facing away from the vacuum, will be combined for example with a radius of curvature R=8.5 mm of the first boundary surface in order to obtain a high radiation intensity at the optical sensor 7 if the refractive index of the insulator element corresponds to the refractive index of sapphire, in particular if the insulator element is made of sapphire. An insulator element that is flat on one side has the advantage that the orientation of the insulator element can be controlled very precisely during the manufacturing process of the electrical feedthrough. This has the advantage that the position of a focal point can be precisely controlled by simple means, resulting in high reproducibility of the position of the focal point.

Two beam paths of electromagnetic radiation 25', 25", which emanate from the plasma region 26 and are focused by the insulator element 2, which is transmissive to the radiation, towards the optical sensor 7, are shown. The wavelength electromagnetic radiation hν lies in the optical wavelength range. Pole shoes 27 guide the magnetic field of the magnet assembly 6 in such a way that the plasma region 26 is restricted to a region of the anode which is remote from the insulator element 2. The anode is formed by the conductor element 1. The cathode 28 of the vacuum pressure sensor is arranged in a cylindrical shape around the central anode in the section shown. The area of the cathode shown in dashed lines can form a transition to the vacuum system in any geometry, but in a vacuum-tight manner. The direction to the vacuum system is indicated by an arrow. The vacuum system may be a vacuum system, for example a vacuum system for depositing thin films on substrates and/or for processing semiconductor wafers.

Figure 4:
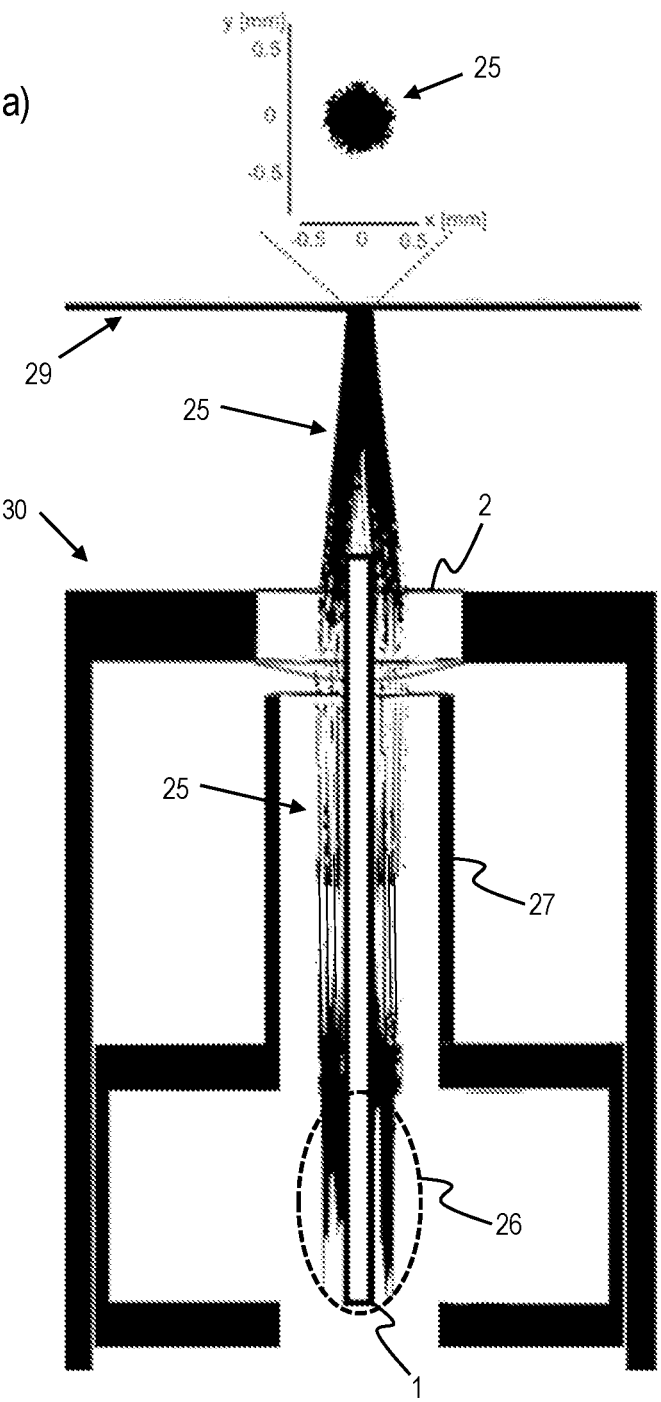
FIG. 4 shows in subfigure 4.a) a cross-section through an embodiment of the vacuum pressure sensor together with a bundle of beams of electromagnetic radiation and their impingement on an image plane.

FIG. 4 shows a cross-section through a vacuum pressure sensor according to the invention with a bundle of beams of electromagnetic radiation and their impingement on an image plane 29 as can be seen from a simulation of the beam paths. A plurality of different beams originating in an area around the anode and impinging on the insulator element are focused on the image plane. In this case, the approximately circular area on which the rays impinge on the image plane is smaller than the area on which the same plurality of rays impinge on the insulator element. This means that the radiation intensity in the circular area on the image plane is higher than the radiation intensity on that boundary surface of the insulator element which faces the vacuum side of the pressure sensor. An optical sensor, such as is present in one embodiment of the pressure sensor, can be arranged with its sensitive area where the circular area on the image plane can be seen. As can be read from the millimeter scale on the x and y axes (x [mm], y [mm]) in the image plane, the beams can be focused on a circular area approximately 0.5 mm in diameter. For the simulation shown, the geometry parameters were used as described in FIG. 3, i.e. in particular R=8.5 mm and d=10 mm, together with the refractive index of sapphire for the insulator element 2.

LIST OF REFERENCE SIGNS

1 Conductor element
1' Further conductor element
2 Insulator element
3 Fusion glass ring
4 Metallic frame (welding ring)
5 Voltage source
6 Magnet assembly
7 Optical sensor
10 Electrical feedthrough
11 First rod end
12 Second rod end
21 First boundary surface
22 Second boundary surface
23 Through-opening
24 Vacuum-tight connection
25', 25", hν Electromagnetic radiation
26 Plasma region
27 Pole shoe
28 Cathode
29 Image plane
30 Vacuum pressure sensor
N, S North pole, south pole of the magnet assembly
U Electrical voltage
Vacuum side Side to which vacuum is applied during operation

The invention claimed is:

1. A vacuum-tight electrical feedthrough, comprising
an electrically insulating insulator element having a through-opening, having a first boundary surface adjacent to the through-opening, and having a second boundary surface also adjacent to the through-opening and opposite to the first boundary surface; and
an electrically conductive conductor element which extends through the through-opening and which is connected in a vacuum-tight manner to the insulator element along a circumferential line of the conductor element, wherein the insulator element is transmissive to electromagnetic radiation in an optical wavelength range, wherein the first and/or the second boundary surface is formed as a curved surface, in particular as a convex or concave surface, wherein the conductor element has a rod-shaped design having a first rod end projecting further beyond the first boundary surface than a second rod end that projects beyond the second boundary surface, and wherein the insulator element forms an imaging lens which images at least a first object point in a region between the first boundary surface and the first rod end onto a first image point that is further from the first boundary surface than the second rod end.

2. The vacuum-tight electrical feedthrough according to claim 1, further comprising a metallic frame which is connected in a vacuum-tight manner to the insulator element along a circumferential line of the insulator element separating the first and second boundary surfaces.

3. The vacuum-tight electrical feedthrough according to claim 1, wherein the conductor element extends along an axis, wherein the first boundary surface has a first region and the second boundary surface has a second region, and wherein the first and second regions are in the form of first and second surfaces of revolution with the axis as a common axis of revolution.

4. The vacuum-tight electrical feedthrough according to claim 1, wherein the insulator element is a plano-convex lens having a central through-opening.

5. The vacuum-tight electrical feedthrough according to claim 1, wherein the insulator element is made of sapphire.

6. The vacuum-tight electrical feedthrough according to claim 1, wherein a fused glass ring forms a vacuum-tight connection between conductor element and insulator element.

7. A vacuum pressure sensor having an electrical feedthrough according to claim 1.

8. Vacuum pressure sensor according to claim 7, wherein the vacuum pressure sensor is formed as a cold cathode vacuum meter, and wherein the conductor element forms an anode of the cold cathode vacuum meter.

9. The vacuum pressure sensor according to claim 8, wherein the first boundary surface faces a plasma region of the vacuum pressure sensor, and wherein an optical sensor is arranged on a side of the second boundary surface such that electromagnetic radiation of the optical wavelength range can propagate from the plasma region through the insulator element to the optical sensor.

10. The vacuum pressure sensor according to claim 9, wherein the first object point is located in the plasma region of the vacuum pressure sensor, and wherein the optical sensor is arranged at the first image point.

11. The vacuum pressure sensor according to claim 9, wherein the plasma region is restricted by a magnet assembly to an end of the anode remote from the insulator element.

12. The vacuum pressure sensor according to claim 7, wherein the conductor element has an electrically insulating coating in a region near the insulator element.

13. A method for measuring a radiation intensity of electromagnetic radiation in an optical wavelength range by a vacuum apparatus that includes the vacuum-tight electrical feedthrough of claim 1.

14. A method for measuring a radiation intensity of electromagnetic radiation in an optical wavelength range, wherein the method comprises:

providing a vacuum apparatus having a vacuum-tight electrical feedthrough, wherein the vacuum-tight electrical feedthrough comprises:

an electrically insulating insulator element having a through-opening, having a first boundary surface adjacent to the through-opening, and having a second boundary surface also adjacent to the through-opening and opposite to the first boundary surface; and an electrically conductive conductor element which extends through the through-opening and which is connected in a vacuum-tight manner to the insulator element along a circumferential line of the conductor element;

supplying electrical energy through the conductor element into a vacuum region of the vacuum apparatus to ignite and maintain a plasma in the vacuum region; and measuring the radiation intensity of electromagnetic radiation emitted from the plasma by an optical sensor, wherein the insulator element is transmissive to electromagnetic radiation in an optical wavelength range, the first and/or the second boundary surface is formed as a curved surface, in particular as a convex or concave surface, and the electromagnetic radiation radiates from the plasma through the insulator element onto the optical sensor.

\* \* \* \* \*